(12) United States Patent
Nogami et al.

(10) Patent No.: US 9,470,166 B2
(45) Date of Patent: Oct. 18, 2016

(54) CONTROL APPARATUS FOR INTERNAL COMBUSTION ENGINE

(75) Inventors: Hiroki Nogami, Kariya (JP); Hiroyuki Takezoe, Kariya (JP); Hiroshi Katsurahara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 972 days.

(21) Appl. No.: 13/481,231

(22) Filed: May 25, 2012

(65) Prior Publication Data

US 2012/0303250 A1    Nov. 29, 2012

(30) Foreign Application Priority Data

May 27, 2011   (JP) ................................ 2011-119728

(51) Int. Cl.
| | | |
|---|---|---|
| G06F 19/00 | (2011.01) | |
| F02D 41/12 | (2006.01) | |
| F02D 17/04 | (2006.01) | |
| F02D 41/00 | (2006.01) | |
| F02D 41/04 | (2006.01) | |
| F02D 41/14 | (2006.01) | |

(52) U.S. Cl.
CPC ......... *F02D 41/123* (2013.01); *F02D 41/0072* (2013.01); *F02D 17/04* (2013.01); *F02D 41/0055* (2013.01); *F02D 41/042* (2013.01); *F02D 2041/1431* (2013.01); *F02D 2200/0402* (2013.01); *Y02T 10/47* (2013.01)

(58) Field of Classification Search
CPC ............. F02D 41/123; F02D 41/0055; F02D 41/126; Y02T 10/47
USPC ........................................................ 701/112
See application file for complete search history.

(56) References Cited

U.S. PATENT DOCUMENTS

| | | | | |
|---|---|---|---|---|
| 7,848,872 B2 * | 12/2010 | Ma | ...................... | F02D 41/0072 123/568.21 |
| 8,006,494 B2 * | 8/2011 | Nagae | ......................... | 60/605.2 |
| 8,122,717 B2 * | 2/2012 | Joergl | ................. | F02B 29/0475 123/568.12 |
| 9,151,233 B2 * | 10/2015 | Sasaki | ................. | F02D 13/0215 |
| 2007/0250250 A1 * | 10/2007 | Yoshioka et al. | ............. | 701/104 |
| 2008/0147294 A1 * | 6/2008 | Tomatsuri et al. | ........... | 701/102 |

(Continued)

FOREIGN PATENT DOCUMENTS

| | | |
|---|---|---|
| JP | 06-025528 | 4/1994 |
| JP | 8-61112 | 3/1996 |

(Continued)

OTHER PUBLICATIONS

U.S. Appl. No. 13/480,583 of Minami et al, filed May 25, 2012.

(Continued)

*Primary Examiner* — Mahmoud Gimie
*Assistant Examiner* — David Hamaoui
(74) *Attorney, Agent, or Firm* — Nixon & Vanderhye P.C.

(57) ABSTRACT

EGR gas quantity information, which indicates a quantity of the EGR gas flowing into a cylinder of an internal combustion engine, is obtained by an ECU. A combustion stop delay control operation, which delays execution of a combustion stop control operation, is executed by the ECU when the quantity of the EGR gas flowing into the cylinder is larger than a normal combustion determination threshold value. When the quantity of the EGR gas flowing into the cylinder becomes equal to or smaller than the normal combustion determination threshold value, the combustion stop control operation is enabled by the ECU.

7 Claims, 8 Drawing Sheets

(56) References Cited

U.S. PATENT DOCUMENTS

| | | | |
|---|---|---|---|
| 2010/0185380 A1* | 7/2010 | Katou et al. | 701/103 |
| 2010/0186726 A1* | 7/2010 | Takagi | 123/568.16 |
| 2010/0235074 A1* | 9/2010 | Shinagawa | F02D 41/126 701/108 |
| 2011/0166795 A1* | 7/2011 | Ohshima et al. | 702/22 |
| 2012/0303346 A1* | 11/2012 | Takezoe et al. | 703/9 |

FOREIGN PATENT DOCUMENTS

| | | |
|---|---|---|
| JP | 2008-101626 | 5/2008 |
| JP | 2009-191643 | 8/2009 |
| JP | 2009-293382 | 12/2009 |
| JP | 2010-203281 | 9/2010 |

OTHER PUBLICATIONS

U.S. Appl. No. 13/481,641 of Takezoe et al, filed May 25, 2012.
U.S. Appl. No. 13/481,192 of Minami et al, filed May 25, 2012.
Office Action (6 pages) dated Feb. 8, 2014, issued in corresponding Chinese Application No. 201210166860.3 and English translation (7 pages).
Office Action (2 pages) dated Feb. 26, 2014, issued in corresponding Japanese Application No. 2011-119728 and English translation (3 pages).

* cited by examiner

CONTROL APPARATUS FOR INTERNAL COMBUSTION ENGINE

CROSS REFERENCE TO RELATED APPLICATION

This application is based on and incorporates herein by reference Japanese Patent Application No. 2011-119728 filed on May 27, 2011.

TECHNICAL FIELD

The present disclosure relates to a control apparatus for an internal combustion engine provided with an EGR device.

BACKGROUND

There is known an internal combustion engine of a vehicle, which is provided with an EGR device to recirculate a portion of exhaust gas as EGR gas to an intake passage for the purpose of improving fuel consumption and reducing exhaust emissions. Furthermore, it is also known to execute a fuel cut control operation and an idle reduction control operation. The fuel cut control operation is an operation that stops combustion of the internal combustion engine by stopping fuel injection upon satisfaction of a fuel cut condition at the time of, for example, decelerating the engine (thereby decelerating the vehicle). The idle reduction control operation is an operation that stops combustion of the internal combustion engine by stopping the fuel injection and/or ignition of the fuel upon satisfaction of an idle reduction condition.

However, in the internal combustion engine, which is provided with the EGR device, when the combustion stop control operation, such as the fuel cut control operation or the idle reduction control operation, which stops the combustion of the internal combustion engine, is executed, the EGR gas remains in the intake passage even upon closing of the EGR valve. Therefore, at the time of restarting the engine after the execution of the combustion stop control operation (after stopping of the combustion of the engine), a large quantity of the EGR gas may possibly flow into a cylinder of the engine. When a quantity of the EGR gas, which flows into the cylinder at the time of restarting the engine, exceeds an EGR limit (an upper limit value of the quantity of the EGR gas, which can be combusted normally), the combustion state may possibly become unstable, thereby possibly deteriorating the restartability of the engine.

In view of the above point, JP2009-191643A teaches the following technique. Specifically, the timing, at which the fuel cut condition is satisfied, is predicted based on traffic information of a road, along which the vehicle travels. A control operation (e.g., an operation of controlling an opening degree of the EGR valve to a closing side thereof), which reduces a quantity of the EGR gas present in the intake system of the internal combustion engine, is executed at a time point, which is earlier than the predicted timing of the satisfying of the fuel cut condition by a predetermined time period.

However, according to the technique of JP2009-191643A, although the operation of reducing the quantity of the EGR gas present in the intake system is executed, JP2009-191643A does not teach or suggest a function of determining a quantity of the EGR gas, which actually flows into the cylinder. Therefore, there is a possibility of that the quantity of the EGR gas, which flows into the cylinder at the time of restarting the engine after the execution of the combustion stop control operation, is not sufficiently reduced. In such a case, the combustion state may become unstable, thereby possibly resulting in the deterioration of restartability of the engine.

SUMMARY

The present disclosure addresses the above points.

According to the present disclosure, there is provided a control apparatus for an internal combustion engine that is provided with an exhaust gas recirculation (EGR) device, which recirculates a portion of exhaust gas of the internal combustion engine as EGR gas to an intake passage of the internal combustion engine. The control apparatus includes a combustion stop control arrangement, a cylinder-inflow EGR gas quantity determining arrangement and a combustion stop delay control arrangement. The combustion stop control arrangement executes a combustion stop control operation, which stops combustion in the internal combustion engine, when a predetermined combustion stop demand is generated. The cylinder-inflow EGR gas quantity determining arrangement estimates or senses cylinder-inflow EGR gas quantity information that indicates one of a cylinder-inflow EGR gas quantity and information that relates to the cylinder-inflow EGR gas quantity. The cylinder-inflow EGR gas quantity is a quantity of the EGR gas, which flows into a cylinder of the internal combustion engine. The combustion stop delay control arrangement executes a combustion stop delay control operation, which delays execution of the combustion stop control operation based on the cylinder-inflow EGR gas quantity information.

The cylinder-inflow EGR gas quantity information may indicate the cylinder-inflow EGR gas quantity. The cylinder-inflow EGR gas quantity determining arrangement may estimates and stores a value of an EGR gas flow quantity of a portion of the EGR gas that is present between a first location of the intake passage, which is on a downstream side of an EGR valve of the EGR device, and a second location of the intake passage, which is on an upstream side of the cylinder, based on an EGR valve-passing gas flow quantity, which is a quantity of the portion of the EGR gas passed through the EGR valve. The cylinder-inflow EGR gas quantity determining arrangement may estimate a value of the cylinder-inflow EGR gas quantity based on the stored value of the EGR gas flow quantity of the portion of the EGR gas. The combustion stop delay control arrangement may execute the combustion stop delay control operation when the value of the cylinder-inflow EGR gas quantity is larger than a normal combustion determination threshold value.

BRIEF DESCRIPTION OF THE DRAWINGS

The drawings described herein are for illustration purposes only and are not intended to limit the scope of the present disclosure in any way.

DETAILED DESCRIPTION

An embodiment of the present disclosure will be described with reference to the accompanying drawings.

Figure 1:
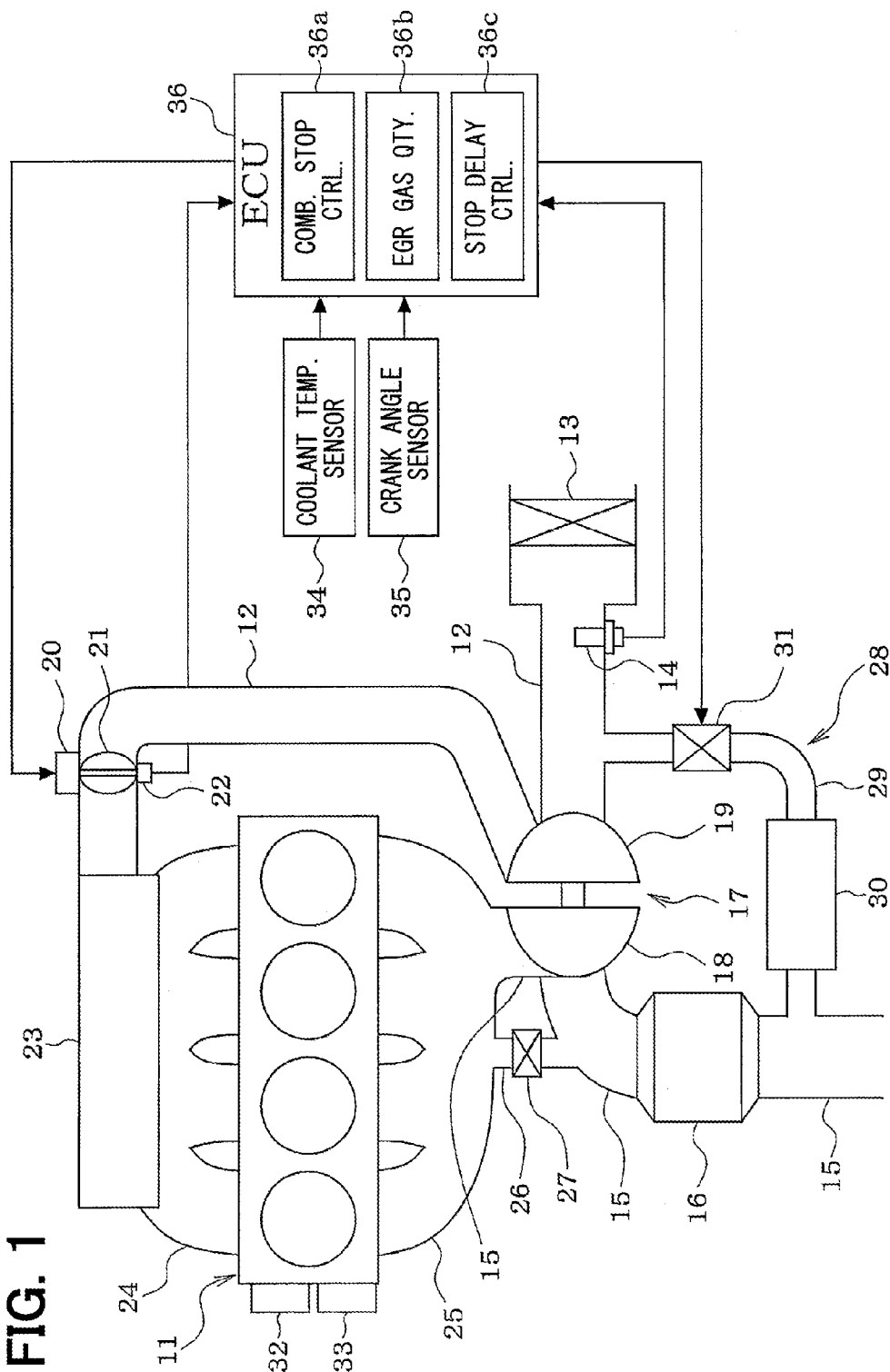
FIG. 1 is a schematic diagram showing a structure of an engine control system, which controls an internal combustion engine provided with a supercharger, according to an embodiment of the present disclosure.

First of all, a structure of an engine control system, which controls an internal combustion engine provided with a supercharger, will be described with reference to FIG. 1.

An air cleaner 13 is placed at a furthermost upstream portion of an intake conduit 12 (an intake passage) of the internal combustion engine (hereinafter simply referred to as the engine) 11. An air flow meter 14 is placed in the intake conduit 12 on the downstream side of the air cleaner 13 in a flow direction of the intake air to sense a flow quantity of the intake air (fresh air). A catalytic converter (e.g., a three-way catalytic converter) 16 is placed in an exhaust conduit 15 (an exhaust passage) of the engine 11 to purify the exhaust gas by converting noxious substances, such as carbon monoxide (CO), hydrocarbon (HC) and nitrogen oxide (NOx) of the exhaust gas into less noxious substances.

An exhaust turbine supercharger 17, which supercharges the intake air, is provided to the engine 11. An exhaust turbine 18 of the supercharger 17 is placed on an upstream side of the catalytic converter 16 in a flow direction of exhaust gas in the exhaust conduit 15. A compressor 19 of the supercharger 17 is placed on a downstream side of the air flow meter 14 in the intake conduit 12. In the supercharger 17, the exhaust turbine 18 and the compressor 19 are coupled with each other to rotate integrally. When the exhaust turbine 18 is rotated by a kinetic energy of the exhaust gas, the compressor 19 is rotated to supercharge the intake air.

A throttle valve 21 and a throttle opening degree sensor 22 are placed on a downstream side of the compressor 19 in the intake conduit 12. The throttle valve 21 is driven by an electric motor 20 to adjust an opening degree thereof. The throttle opening degree sensor 22 senses the opening degree (a throttle opening degree) of the throttle valve 21.

An intercooler, which cools the intake air, is provided integrally with a surge tank 23 (the intake passage) at a location that is on a downstream side of the throttle valve 21. Here, it should be noted that the intercooler may be placed on an upstream side of the surge tank 23 and/or the throttle valve 21, if desired. An intake manifold 24 (the intake passage), which guides the air into the respective cylinders of the engine 11, is provided to the surge tank 23. Furthermore, fuel injection valves (not shown) are provided for the cylinders such that each fuel injection valve (not shown) is adapted to inject fuel into the corresponding cylinder or a corresponding intake port associated with the cylinder. Spark plugs (not shown) are provided for the cylinders, respectively, and are installed to a cylinder head of the engine 11. A mixture of fuel and air in each cylinder is ignited through spark discharge of the spark plug.

An exhaust manifold 25 is connected to an exhaust opening of each cylinder of the engine 11, and a downstream side merging portion of the exhaust manifold 25 is connected to a portion of the exhaust conduit 15, which is located on an upstream side of the exhaust turbine 18. An exhaust gas bypass passage 26 bypasses the exhaust turbine 18 by connecting between a portion of the exhaust manifold 25, which is located on an upstream side of the exhaust turbine 18, and a portion of the exhaust conduit 15, which is located on a downstream side of the exhaust turbine 18. A wastegate valve 27 is installed in the exhaust gas bypass passage 26 to open or close the exhaust gas bypass passage 26.

A low pressure loop exhaust gas recirculation (LPL EGR) device 28 is provided to the engine 11. The EGR device 28 recirculates a part of the exhaust gas as EGR gas from the exhaust conduit 15 into the intake conduit 12. In the EGR device 28, an EGR conduit 29 (an EGR passage) connects between a portion of the exhaust conduit 15, which is located on a downstream side of the catalytic converter 16, and a portion of the intake conduit 12, which is located on an upstream side of the compressor 19 (a part of the intake passage located on the upstream side of the throttle valve 21). An EGR cooler 30 and an EGR valve 31 are provided in the EGR conduit 29. The EGR cooler 30 cools the EGR gas. The EGR valve 31 adjusts a flow quantity (EGR gas flow quantity) of the EGR gas, which flows through the EGR conduit 29. An opening degree of the EGR valve 31 is adjusted by an actuator (not shown), such as an electric motor. When the EGR valve 31 is opened, the EGR gas is recirculated from the portion of the exhaust conduit 15, which is located on the downstream side of the catalytic converter 16, to the portion of the intake conduit 12, which is located on the upstream side of the compressor 19 (the part of the intake passage located on the upstream side of the throttle valve 21).

Furthermore, an intake side variable valve timing mechanism 32 and an exhaust side variable valve timing mechanism 33 are provided to the engine 11. The intake side variable valve timing mechanism 32 adjusts, i.e., changes valve timing (opening timing and closing timing) of intake valves (not shown). The exhaust side variable valve timing mechanism 33 adjusts, i.e., changes the valve timing of exhaust valves (not shown). Furthermore, a coolant temperature sensor 34 and a crank angle sensor 35 are provided to the engine 11. The coolant temperature sensor 34 senses the temperature of engine coolant, which is circulated to cool the engine 11. The crank angle sensor 35 outputs a pulse signal at every predetermined crank angle upon rotation of a crankshaft (not shown). A crank angle and an engine rotational speed are sensed, i.e., are determined based on the output signals of the crank angle sensor 35.

Outputs of the above-described sensors are supplied to an electronic control unit (ECU) 36. The ECU 36 includes a microcomputer as its main component. When the ECU 36 executes engine control programs, which are stored in a ROM (a storage) of the ECU 36, for example, a fuel injection quantity of each fuel injection valve, ignition timing of each spark plug and the opening degree of the throttle valve 21 (an intake air quantity) are controlled.

At that time, the ECU 36 computes a target EGR rate based on an engine operational state (e.g., an engine load and the engine rotational speed) and controls the opening degree of the EGR valve 31 to implement the target EGR rate.

Furthermore, the ECU 36 includes a combustion stop control arrangement 36a, which executes a fuel cut control operation and an idle reduction control operation. The fuel cut control operation is a control operation, which stops the combustion of the engine 11 by stopping the fuel injection when a combustion stop demand is generated upon satisfaction of a fuel cut condition, for example, at the time of decelerating the engine (thereby decelerating the vehicle) in a driving period of the vehicle. The idle reduction control operation is a control operation, which stops the fuel injection and/or the ignition of the fuel when the combustion stop demand is generated upon satisfaction of an idle reduction condition, for example, at the time of decelerating the engine (thereby decelerating the vehicle) immediately before stopping of the vehicle or at the time of stopping the vehicle. These functions may serve as a combustion stop control means.

However, in the engine 11, which is provided with the EGR device 28, when the combustion stop control operation, such as the fuel cut control operation or the idle reduction control operation, which stops the combustion of fuel in the engine 11, is executed, the EGR gas may possibly remain in the intake conduit 12 even after the closing of the EGR valve 31. Therefore, at the time of restarting the engine 11 after the execution of the combustion stop control operation (after stopping of the combustion), a large quantity of EGR gas may possibly flow into the cylinder. When the quantity of EGR gas, which flows into the cylinder at the time of restarting the engine 11, exceeds an EGR limit (an upper limit value of the quantity of the EGR gas, which can be combusted normally (combusted in a normal manner), i.e., an upper limit value of an EGR gas quantity), the combustion state may possibly become unstable, thereby possibly deteriorating the restartability of the engine 11.

Figure 2:
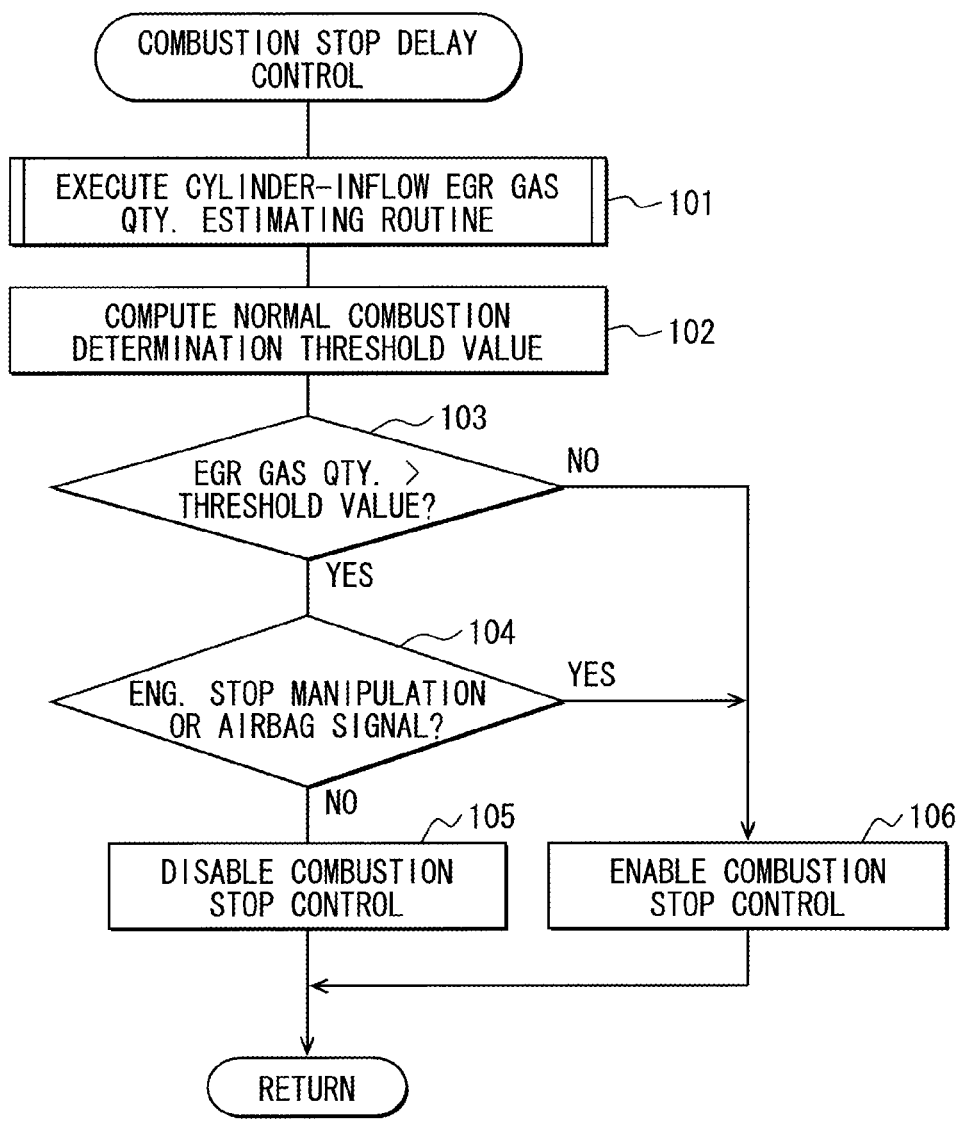
FIG. 2 is a flowchart showing a flow of a combustion stop delay control routine according to the embodiment.

In order to address the above disadvantage, the ECU 36 of the present embodiment executes a combustion stop delay control routine of FIG. 2. A cylinder-inflow EGR gas quantity determining arrangement 36b of the ECU 36 estimates a quantity of the EGR gas supplied into the cylinder (also referred to as a cylinder-inflow EGR gas quantity) by using an estimating method (see FIGS. 3 to 6) described later. Then, a combustion stop delay control arrangement 36c of the ECU 36 compares the estimated quantity of EGR gas supplied into the cylinder with a normal combustion determination threshold value to determine whether the normal combustion is possible at the time of restarting the engine 11 after execution of the combustion stop control operation (after stopping of the combustion). When it is determined that the normal combustion is not possible at the time of restarting the engine after the execution of the combustion stop control operation (the combustion may possibly become unstable), the combustion stop delay control arrangement 36c of the ECU 36 executes a combustion stop delay control operation, which delays, i.e., postpones the execution of the combustion stop control operation. Thereafter, when it is determined that the normal combustion is possible at the time of restarting the engine 11 after the execution of the combustion stop control operation based on the estimated cylinder-inflow EGR gas quantity during the execution of the combustion stop delay control operation, the combustion stop delay control arrangement 36c of the ECU 36 terminates the combustion stop delay control operation, and the combustion stop control arrangement 36a of the ECU 36 executes the combustion stop control operation.

Now, the combustion stop delay control operation routine of FIG. 2, which is executed by the ECU 36 in the present embodiment, will be described.

The combustion stop delay control routine of FIG. 2 is repeatedly executed mainly by the combustion stop delay control arrangement 36c (serving as a combustion stop delay control means) at a predetermined cycle during an ON period of the electric power source of the ECU 36. When the routine is started, at step 101, a cylinder-inflow EGR gas quantity estimating routine is executed to estimate the cylinder-inflow EGR gas quantity (cylinder-inflow EGR gas quantity information indicating the cylinder-inflow EGR gas quantity) through the estimating method described later (see FIGS. 3 to 6). This process at step 101 is executed by the cylinder-inflow EGR gas quantity determining arrangement 36b of the ECU 36 and may serve as a cylinder-inflow EGR gas quantity determining means.

Thereafter, the operation proceeds to step 102 where the corresponding normal combustion determination threshold value, which corresponds to the engine operational state (e.g., the engine load and the engine rotational speed) and the coolant temperature, is computed by using a map or a mathematical equation. This normal combustion determination threshold value is set as an upper limit value of the cylinder-inflow EGR gas quantity, which can be normally combusted at the time of restarting the engine after the execution of the combustion stop control operation (after the stopping of the combustion), or is set to a value that is smaller than the upper limit value of the cylinder-inflow EGR gas quantity by a predetermined amount.

The map or the equation for determining the normal combustion determination threshold value is set as follows. That is, when the engine load (e.g., the intake air quantity or the intake conduit pressure) is decreased, the normal combustion determination threshold value is decreased. Furthermore, when the engine rotational speed is decreased, the normal combustion determination threshold value is decreased. In addition, when the coolant temperature is decreased, the normal combustion determination threshold value is decreased. The map or the equation for determining the normal combustion determination threshold value is prepared in advance based on experimental data or design data and is stored in the ROM of the ECU 36.

Thereafter, the operation proceeds to step 103 where it is determined whether the normal combustion is possible at the time of restarting the engine 11 after the execution of the combustion stop control operation by comparing the cylinder-inflow EGR gas quantity with the normal combustion determination threshold value.

When it is determined that the cylinder-inflow EGR gas quantity is larger than the normal combustion determination threshold value at step 103 (i.e., YES at step 103), it is determined that the normal combustion is not possible (possibly causing the unstable combustion) at the time of restarting the engine 11 after the execution of the combustion stop control operation. Then, the operation proceeds to step 104 where it is determined whether an engine stop manipulation operation (e.g., turning off of the ignition switch) is executed by the driver of the vehicle or an airbag signal for deploying an airbag is outputted.

When it is determined that the engine stop manipulation operation is executed by the driver of the vehicle or the airbag signal for deploying the airbag is outputted at step 104 (i.e., YES at step 104), the operation proceeds to step 106. At step 106, the combustion stop control operation is enabled, and the combustion stop delay control operation is disabled, i.e., is terminated. Thereby, in the case where the combustion stop demand is generated upon the execution of the engine stop manipulation operation by the driver of the vehicle, or in the case where the combustion stop demand is generated upon the outputting of the air bag signal in response to sensing of collision of the vehicle, the combustion stop control operation is executed immediately to immediately stop the combustion of the engine 11.

In contrast, when it is determined that the engine stop manipulation operation is not executed by the driver of the vehicle and the airbag signal for deploying the airbag is not outputted at step 104 (i.e., NO at step 104), the operation proceeds to step 105. At step 105, the combustion stop control operation is disabled, i.e., is prohibited. Thereby, even when the combustion stop demand is generated upon satisfaction of the fuel cut condition or the idle reduction condition, the combustion stop delay control operation is executed to delay the execution of the combustion stop control operation and thereby to continue the combustion (the fuel injection and ignition of fuel) of the engine 11.

Thereafter, during the execution of the combustion stop delay control operation, when it is determined that the cylinder-inflow EGR gas quantity is equal to or smaller than the normal combustion determination threshold value at step 103 (i.e., NO at step 103), it is determined that the normal combustion is possible at the time of restring the engine 11 after the execution of the combustion stop control operation. Therefore, the operation proceeds to step 106 where the combustion stop control operation is enabled. Thereby, the combustion stop delay control operation is terminated, and the combustion stop control operation, which stops the combustion of the engine 11, is executed by stopping the fuel injection and/or the ignition of the fuel.

Next, the estimating method for estimating the cylinder-inflow EGR gas quantity executed by the cylinder-inflow EGR gas quantity determining arrangement 36b of the ECU 36 will be described in detail with reference to FIGS. 3 to 6.

As in the present embodiment, in the system that has the LPL EGR device 28, which recirculates the EGR gas to the portion of the intake conduit 12 located on the upstream side of the compressor 19 (the intake passage on the upstream side of the throttle valve 21), the ECU 36 computes (estimates) the cylinder-inflow EGR gas quantity as follows.

Figure 3:
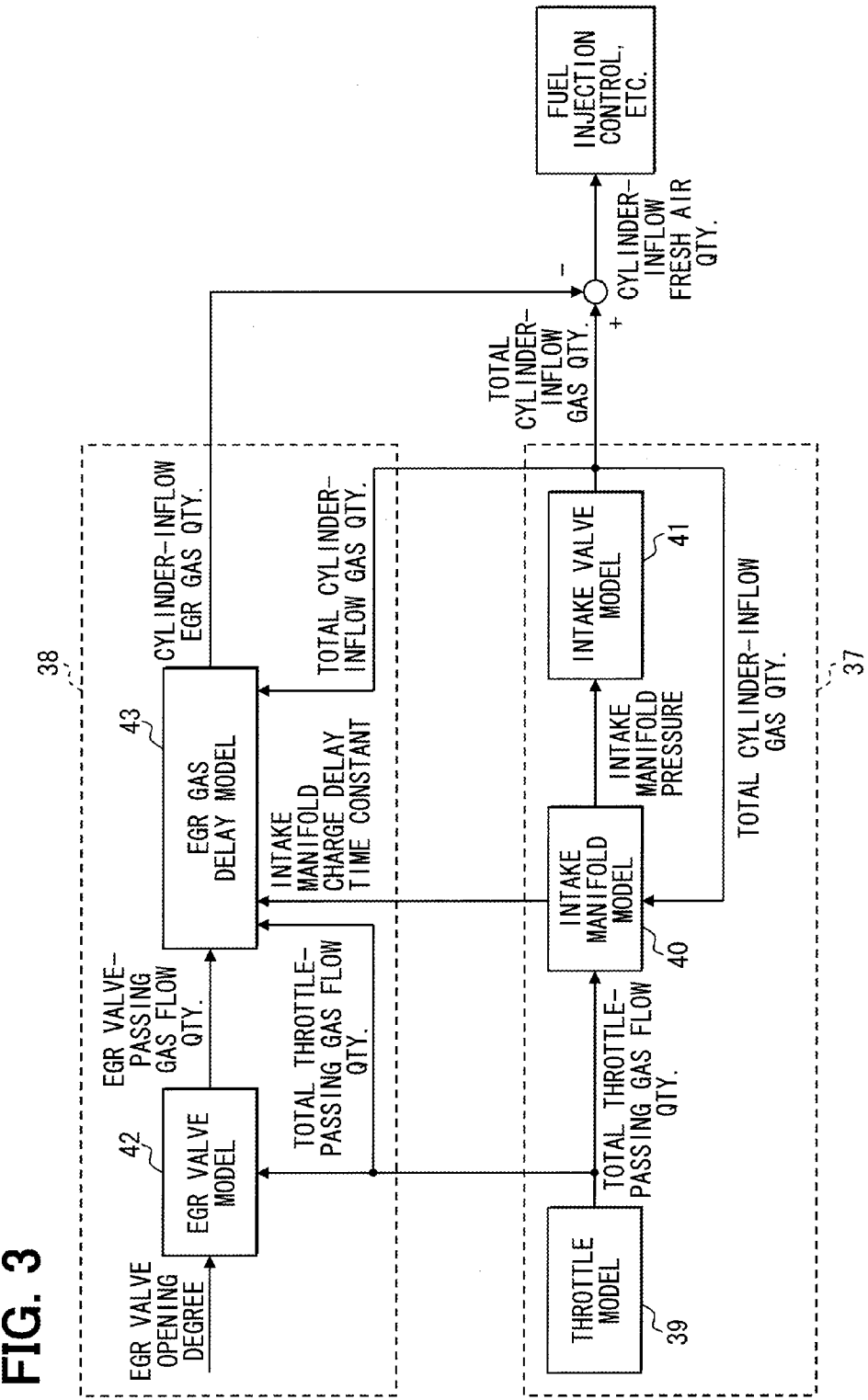
FIG. 3 is a block diagram for describing a computation method for computing a cylinder-inflow EGR gas quantity according to the embodiment.

As shown in FIG. 3, a total cylinder-inflow gas quantity computing portion 37 of the cylinder-inflow EGR gas quantity determining arrangement 36b of the ECU 36 computes a total throttle-passing gas flow quantity (a total quantity of gas that passes through the throttle valve 21) by using a throttle model 39. The throttle model 39 is a model that simulates the behavior of the gas in the intake conduit 12 at the time of passing through the throttle valve 21. For instance, a throttle model, which is recited in JP2008-101626A, may be used as the throttle model 39.

Thereafter, an intake manifold pressure (a pressure in the intake passage on the downstream side of the throttle valve 21) is computed based on the total throttle-passing gas flow quantity and a previous value of the total cylinder-inflow gas quantity by using an intake manifold model 40. The intake manifold model 40 is a model that simulates the behavior of the gas at the time of being charged into a portion (e.g., the surge tank 23 and the intake manifold 24) of the intake passage located on the downstream side of the throttle valve 21 after passing through the throttle valve 21. For instance, an intake conduit model, which is recited in JP2008-101626A, may be used as the intake manifold model 40.

Thereafter, the total cylinder-inflow gas quantity (=cylinder-inflow fresh air quantity+cylinder-inflow EGR gas quantity) is computed based on the intake manifold pressure by using an intake valve model 41. The intake valve model 41 is a model that simulates the behavior of the gas at the time of being drawn into the cylinder after being charged into the portion of the intake passage located on the downstream side of the throttle valve 21. An intake valve model, which is recited in JP2008-101626A, may be used as the intake valve model 41.

A cylinder-inflow EGR gas flow quantity computing portion 38 of the cylinder-inflow EGR gas quantity determining arrangement 36b of the ECU 36 computes an EGR valve-passing gas flow quantity (a flow quantity of the EGR gas, which passes through the EGR valve 31) by using an EGR valve model 42. The EGR valve model 42 is a model that simulates the behavior of the EGR gas at the time of passing through the EGR valve 31 in the EGR conduit 29.

Figure 4:
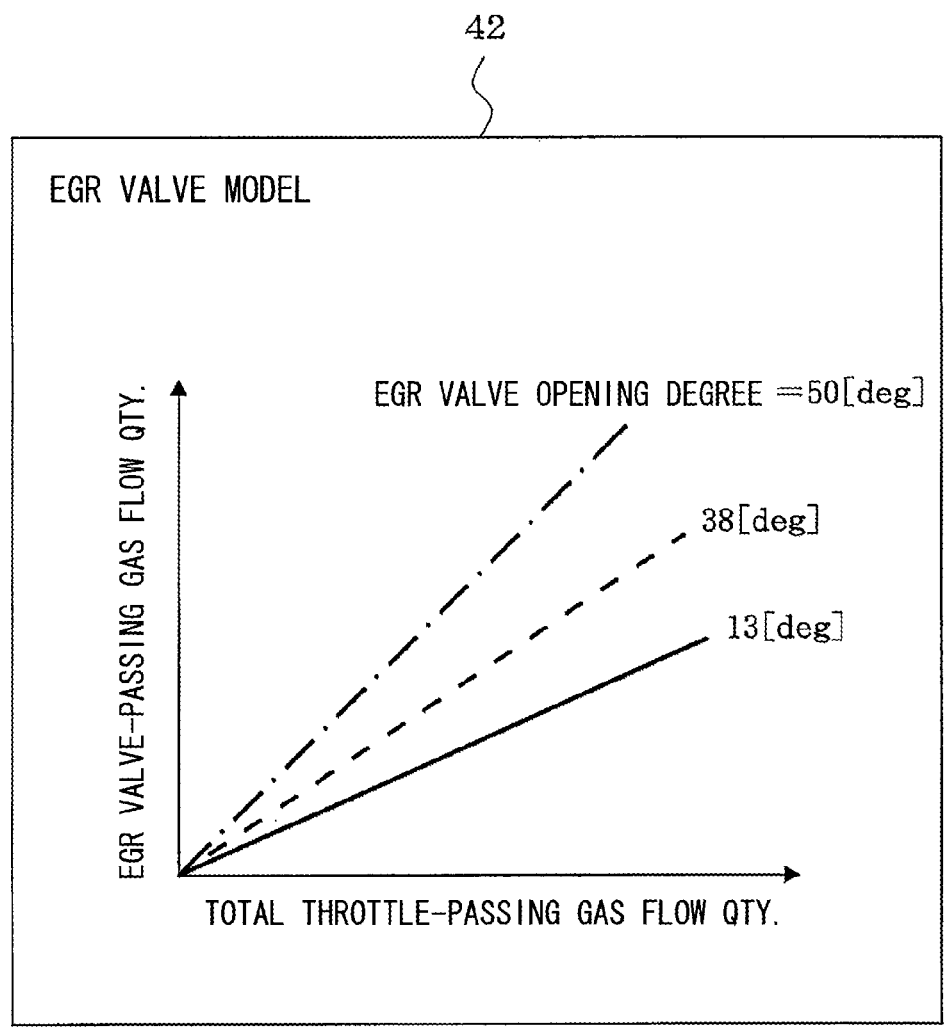
FIG. 4 is a diagram for describing an EGR valve model according to the embodiment.

As shown in FIG. 4, the EGR valve model 42 is constructed as a map that defines a relationship among the opening degree of the EGR valve 31, the total throttle-passing gas flow quantity and the EGR valve-passing gas flow quantity. The EGR valve-passing gas flow quantity is computed based on the opening degree of the EGR valve 31 and the total throttle-passing gas flow quantity by using the map of the EGR valve-passing gas flow quantity. The map of the EGR valve-passing gas flow quantity is prepared in advance based on test data and design data and is prestored in the ROM of the ECU 36.

Alternatively, the EGR valve model 42 may be constructed as a mathematical or physics equation, which defines a relationship among the opening degree of the EGR valve 31, a pressure Pin on the upstream side of the EGR valve 31, a pressure Pout on the downstream side of the EGR valve 31 and the EGR valve-passing gas flow quantity Megr.

Specifically, the EGR valve model 42 may be approximated by using the following equation of a throttle (equation of an orifice).

$$Megr = C \cdot A \cdot \frac{Pin}{\sqrt{R \cdot Tegr}} \cdot \Phi(Pout/Pin)$$

In the above equation, C denotes a discharge coefficient, and A denotes an opening cross-sectional area of the EGR conduit 29, which changes in response to the opening degree of the EGR valve 31. Furthermore, R denotes a gas constant, and Tegr denotes a temperature of the EGR gas on the upstream side of the EGR valve 31. Furthermore, Φ(Pout/Pin) is a function that uses (Pout/Pin) as a variable.

In this case, the EGR valve-passing gas flow quantity Megr is computed based on the opening degree of the EGR valve 31, the pressure Pin on the upstream side of the EGR valve 31, the pressure Pout on the downstream side of the EGR valve 31, and the temperature of the EGR gas by using the equation of the throttle (the equation of the orifice) discussed above.

Thereafter, the cylinder-inflow EGR gas quantity is computed based on the computed value of the EGR valve-passing gas flow quantity by using an EGR gas delay model 43 (see FIG. 3). The EGR gas delay model 43 is a model that simulates the behavior of the EGR gas until the time of flowing into the cylinder by passing through the throttle valve 21 after passing through the EGR valve 31.

Figure 5:
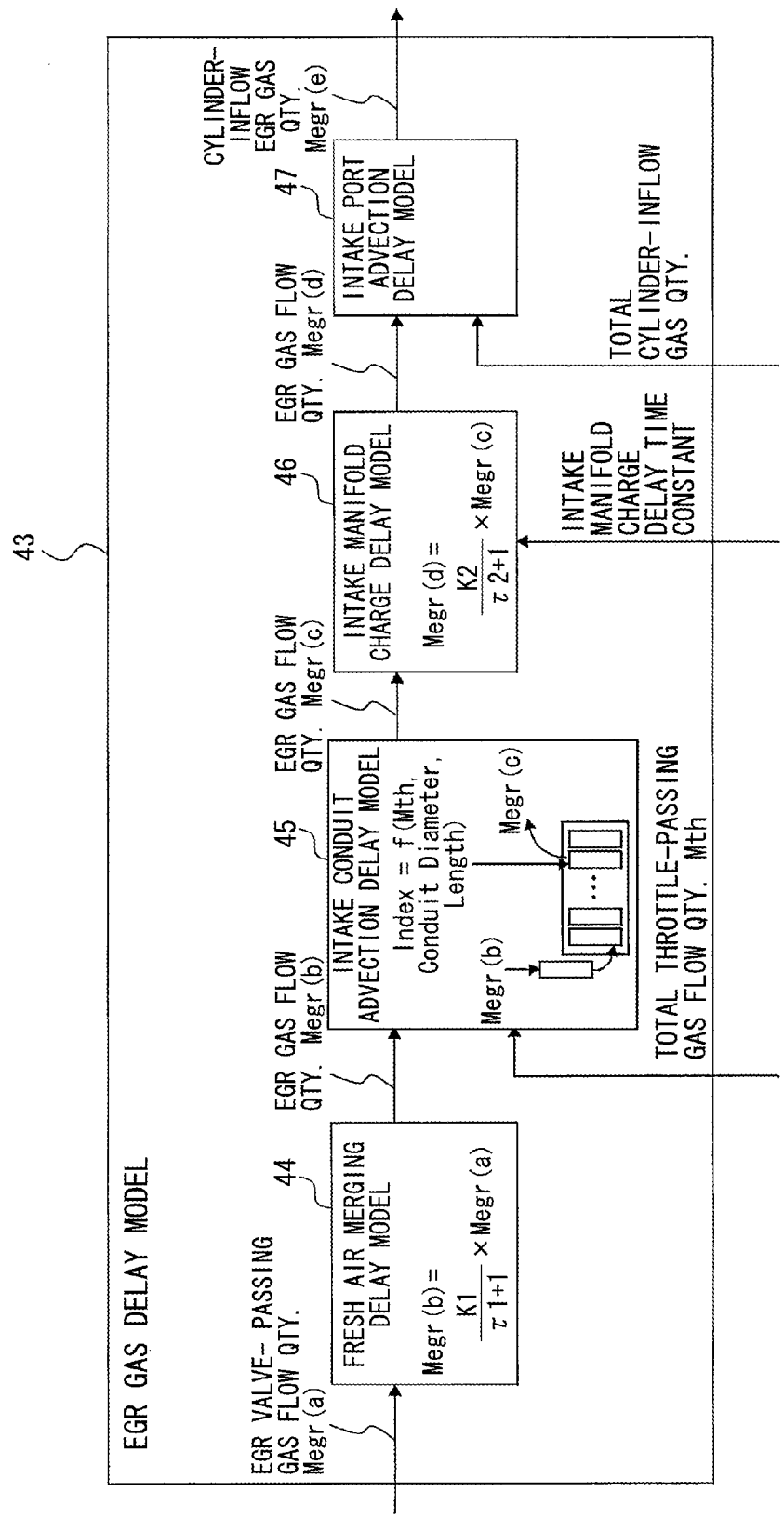
FIG. 5 is a block diagram for describing an EGR gas delay model according to the embodiment.

As shown in FIG. 5, the EGR gas delay model 43 includes a fresh air merging delay model 44, an intake conduit advection delay model 45, an intake manifold charge delay model 46 and an intake port advection delay model 47. The fresh air merging delay model 44 is a model that simulates the behavior of the EGR gas at the time of flowing into a portion (a portion of the intake conduit 12 located on the upstream side of the compressor 19) of the intake passage located on the upstream side of the throttle valve 21 after passing through the EGR valve 31. The intake conduit advection delay model 45 is a model that simulates the behavior of the EGR gas until the time of passing through the throttle valve 21 after flowing into the portion of the intake passage located on the upstream side of the throttle valve 21. The intake manifold charge delay model 46 is a model that simulates the behavior of the EGR gas at the time of being charged into a portion (e.g., the surge tank 23 and the intake manifold 24) of the intake passage located on the downstream side of the throttle valve 21 after passing through the throttle valve 21. The intake port advection delay model 47 is a model that simulates the behavior of the EGR gas until the time of flowing into the cylinder through the intake port after being charged into the portion of the intake passage located on the downstream side of the throttle valve 21.

Thereby, the delay of the EGR gas that occurs at the time of flowing into the portion of the intake passage located on the upstream side of the throttle valve 21, the convection delay of the EGR gas that occurs until the time of passing through the throttle valve 21 after flowing into the portion of the intake passage located on the upstream side of the throttle valve 21, the charge delay of the EGR gas that occurs at the time of being charged into the portion of the intake passage located on the downstream side of the throttle valve 21 after passing through the throttle valve 21, and the convection delay of the EGR gas that occurs until the time of flowing into the cylinder through the intake port after being charged into the portion of the intake passage located on the downstream side of the throttle valve 21 can be reflected into the computation of the cylinder-inflow EGR gas quantity. Thus, the estimation accuracy of the cylinder-inflow EGR gas quantity can be improved.

At the time of computing the cylinder-inflow EGR gas quantity, an EGR gas flow quantity Megr(b), which is a flow quantity of the EGR gas that flows into the portion of the intake passage located on the upstream side of the throttle valve 21, is computed based on an EGR valve-passing gas flow quantity Megr(a) by using the fresh air merging delay model 44.

The fresh air merging delay model is approximated by using the following equation (1).

$$\text{Megr}(b) = [K1/(\tau1+1)] \times \text{Megr}(a) \qquad \text{Equation (1)}$$

A coefficient K1 and the time constant $\tau1$ of the above equation (1) are values that are determined based on a conduit diameter and a conduit length of the portion of the EGR conduit 29 (the portion of the EGR conduit 29 from the EGR valve 31 to a merging portion, at which the EGR conduit 29 is connected to the intake conduit 12) and the conduit diameter of the intake conduit 12. The coefficient K1 and the time constant $\tau1$ are computed in advance based on the test data and the design data.

Thereafter, an EGR gas flow quantity Megr(c), which is a flow quantity of the EGR gas that passes through the throttle valve 21, is computed based on the EGR gas flow quantity Megr(b), which is the flow quantity of the EGR gas that flows into the portion of the intake passage located on the upstream side of the throttle valve 21, and the total throttle-passing gas flow quantity Mth by using the intake conduit advection delay model 45.

Figure 6:
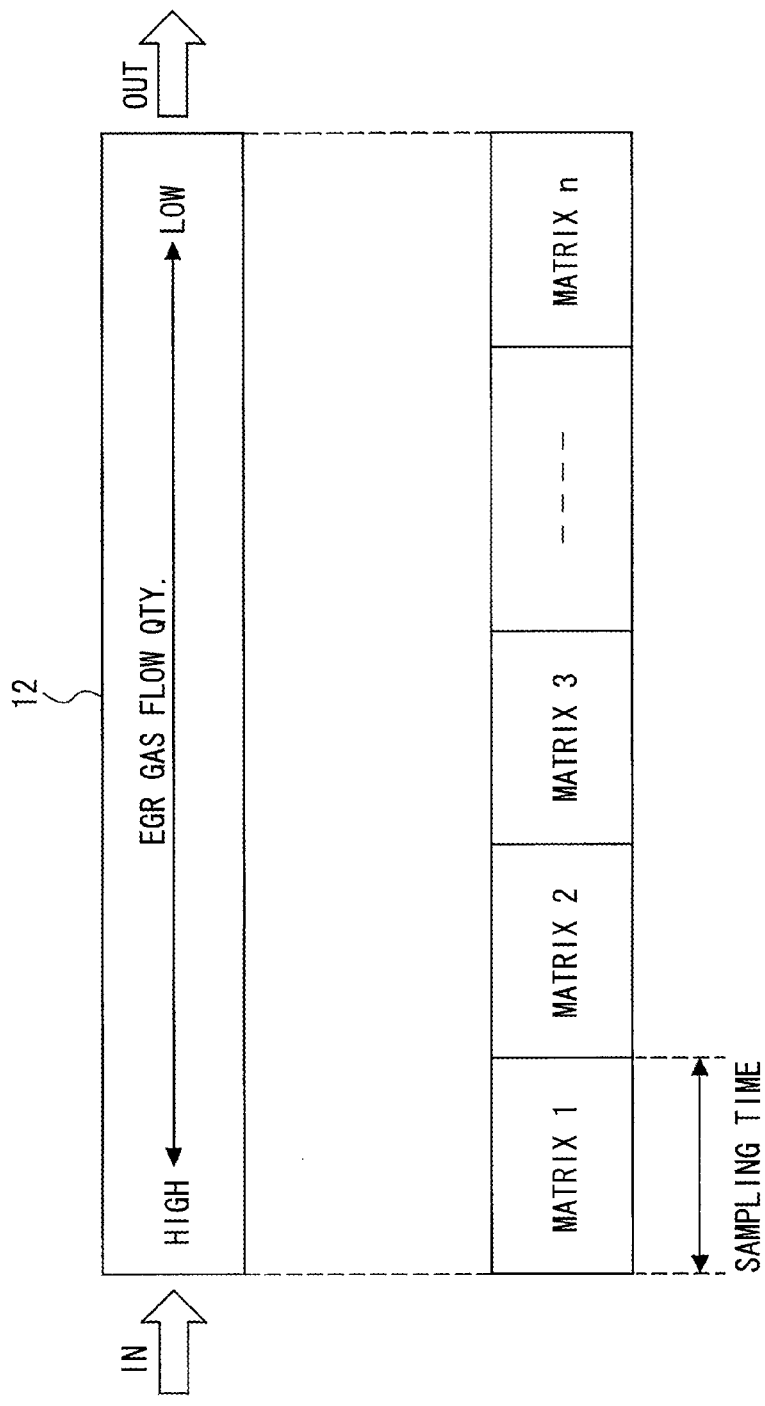
FIG. 6 is a diagram for describing an intake conduit advection delay model according to the embodiment.

With reference to FIG. 6, the intake conduit advection delay model 45 is constructed as follows. Specifically, the behavior of the EGR gas of the continuous time system, which is measured until the time of passing through the throttle valve 21 after flowing into the portion of the intake passage located on the upstream side of the throttle valve 21, is transformed into a plurality of matrices, which are formed at predetermined time intervals through the discretization (e.g., 32 matrices, which are formed one after another at 16 millisecond sampling time intervals through the discretization). These matrices construct the intake conduit advection delay model 45 and form a queue, i.e., the first in first out (FIFO) data structure in the memory (rewritable memory or storage) of the ECU 36. Each matrix indicates the corresponding EGR gas flow quantity. In general, a moving speed of the EGR gas in the intake conduit 12 is sufficiently slow in comparison to the computation speed of the ECU 36, so that the intake conduit advection delay model 45 can be constructed by the matrices, which are formed one after another at the predetermined time intervals through the discretization. Various coefficients, which are used in the intake conduit advection delay model 45, are values that are determined based on a conduit diameter and a conduit length of a portion of the intake conduit 12 (the portion of the intake conduit 12 that is from the merging portion, at which the EGR conduit 29 is connected to the intake conduit 12, to the throttle valve 21) and are computed in advance based on the test data and the design data.

Thereafter, as shown in FIG. 5, the intake manifold charge delay model 46 is used to compute an EGR gas flow quantity Megr(d), which is a flow quantity of the EGR gas charged into the portion (e.g., the surge tank 23 and the intake manifold 24) of the intake passage located on the downstream side of the throttle valve 21, based on the EGR gas flow quantity Megr(c), which is the flow quantity of the EGR gas that passes through the throttle valve 21.

The intake manifold charge delay model 46 is approximated by using the following equation (2).

$$\text{Megr}(d) = [K2/(\tau2+1)] \times \text{Megr}(c) \qquad \text{Equation (2)}$$

A coefficient K2 and an intake manifold charge delay time constant $\tau2$ of the above equation (2) are values that are determined based on, for example, a conduit diameter, a length and a volume of the portion (the portion, such as the surge tank 23 and the intake manifold 24, of the intake conduit 12 located on the downstream side of the throttle valve 21) of the intake passage located on the downstream side of the throttle valve 21. The coefficient K2 and the intake manifold charge delay time constant $\tau2$ of the above equation (2) are computed in advance based on the test data and the design data. In a case where the intake manifold charge delay time constant is used in the intake manifold model 40, the intake manifold charge delay time constant, which is used in the intake manifold model 40, may be used in the intake manifold charge delay model 46.

Thereafter, the intake port advection delay model 47 is used to compute a cylinder-inflow EGR gas quantity Megr (e) based on the EGR gas flow quantity Megr(d), which is the flow quantity of the EGR gas charged into the portion of the intake passage located on the downstream side of the throttle valve 21, and the previous value of the total cylinder-inflow gas quantity.

The intake port advection delay model 47 is constructed as follows. Specifically, the behavior of the EGR gas of the continuous time system, which is measured until the time of flowing into the cylinder through the intake port after being charged into the portion of the intake passage located on the downstream side of the throttle valve 21, is transformed into a plurality of matrices, which are formed one after another at predetermined time intervals through discretization. These matrices construct the intake port advection delay model 47 and form a queue, i.e., the first in first out (FIFO) data structure in the memory of the ECU 36. Various coefficients, which are used in the intake port advection delay model 47, are values that are determined based on the conduit diameter and the conduit length of the corresponding portion of the intake conduit 12 and are computed in advance based on the test data and the design data.

Figure 8:
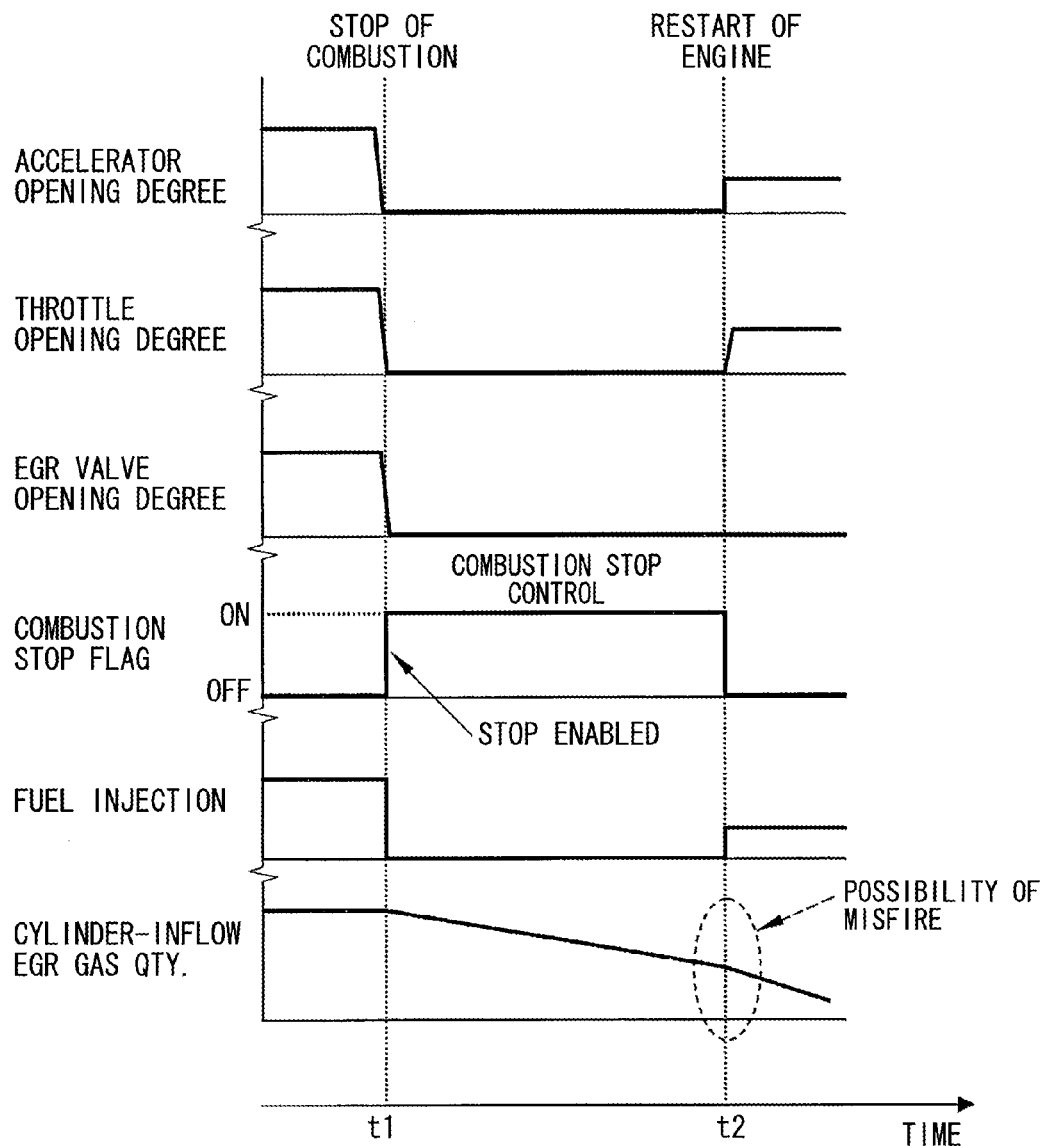
FIG. 8 is a time chart showing execution of a combustion stop control operation according to a previously proposed technique.

As shown in FIG. 8, in a case of a combustion stop control operation of a previously proposed technique, at a time point t1, at which a combustion stop demand is generated upon satisfaction of the idle reduction condition during, for example, the full closing time of the accelerator opening degree (the time of releasing of a gas pedal by the driver of the vehicle), a combustion stop flag is turned on, so that the combustion stop control operation, which stops the combustion of the engine 11 by stopping the fuel injection and/or the ignition of the fuel, is executed. In such a case, even when the EGR valve 31 is closed, the EGR gas remains in the intake conduit 12. Therefore, at a time point t2, at which the engine 11 is restarted upon satisfaction of the restart condition after the execution of the combustion stop control operation (after stopping of the combustion), a large quantity of EGR gas may possibly flow into the cylinder. When the quantity of the EGR gas, which flows into the cylinder at the time of restarting the engine 11, exceeds the EGR limit (the upper limit value of the quantity of the EGR gas, which can be combusted normally), the combustion state may possibly become unstable, thereby possibly deteriorating the restarting of the engine 11.

Figure 7:
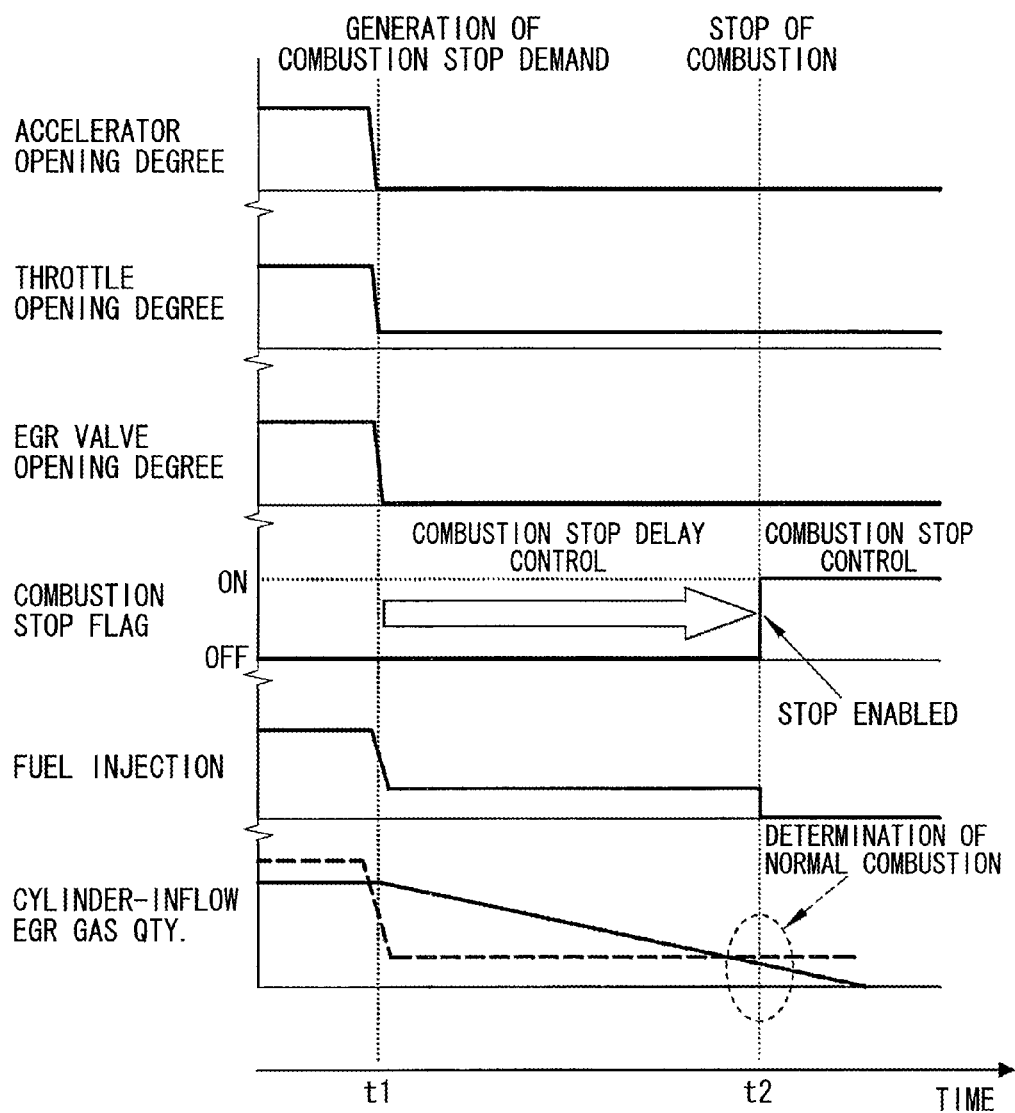
FIG. 7 is a time chart showing execution of a combustion stop delay control operation according to the embodiment.

In contrast, as shown in FIG. 7, in the present embodiment, for example, at the time point t1, at which the combustion stop demand is generated upon satisfaction of the idle reduction condition during, for example, the full closing time of the accelerator opening degree, when the cylinder-inflow EGR gas quantity is larger than the normal combustion determination threshold value (indicated by a dotted line in FIG. 7), it is determined that the normal combustion is not possible (possibly causing the unstable combustion state) at the time of restarting the engine 11 after the execution of the combustion stop control operation (after the stopping of the combustion), and thereby the combustion stop flag is kept in the off-state to prohibit the combustion stop control operation. Thereby, even when the combustion stop demand is generated, the combustion stop delay control operation, which delays the execution of the combustion stop control operation, is executed to maintain the combustion (fuel injection and the ignition of the fuel) of the engine 11.

Thereafter, during the execution of the combustion stop delay control operation, when the cylinder-inflow EGR gas quantity becomes equal to or smaller than the normal combustion determination threshold value at the time point t2, it is determined that the normal combustion at the time of restarting the engine 11 after the execution of the combustion stop control operation is possible, and thereby the combustion stop flag is turned on (placing in the on-state) to enable the execution of the combustion stop control operation. Thereby, the combustion stop delay control operation is terminated, and the combustion stop control operation, which stops the combustion of the engine 11 is executed by stopping the fuel injection and/or the ignition of the fuel.

In the present embodiment discussed above, the cylinder-inflow EGR gas quantity (the quantity of the EGR gas, which flows into the cylinder) is estimated. Thereby, the cylinder-inflow EGR gas quantity can be judged in view of the threshold value. The combustion stop delay control operation, which delays the execution of the combustion stop control operation, is executed based on the estimated cylinder-inflow EGR gas quantity. Therefore, even when the combustion stop demand is generated, the execution of the combustion stop control operation is delayed until the time of sufficiently decreasing the cylinder-inflow EGR gas quantity through scavenging of the EGR gas, which remains in the intake conduit 12. Then, when the cylinder-inflow EGR gas quantity is sufficiently decreased, the combustion stop control operation is executed to stop the combustion of the engine 11. In this way, it is possible to avoid the exceeding of the cylinder-inflow EGR gas quantity beyond the EGR limit (the upper limit value of the quantity of the EGR gas, which can be combusted normally) at the time of restarting the engine after the execution of the combustion stop control operation (after stopping of the combustion), and thereby it is possible to limit the occurrence of the unstable combustion state. As a result, the restartability of the engine 11 can be improved.

Furthermore, in the present embodiment, the cylinder-inflow EGR gas quantity is compared with the normal combustion determination threshold value to determine whether the normal combustion is possible at the time of restarting the engine 11 after the execution of the combustion stop control operation. When it is determined that the normal combustion is not possible (possibly resulting in the unstable state of the combustion) at the time of restarting the engine 11, the combustion stop delay control operation is executed. Therefore, it is possible to reliably limit the occurrence of the unstable combustion state at the time of restarting the engine after the execution of the combustion stop control operation.

Furthermore, in the present embodiment, when it is determined that the normal combustion is possible at the time of restarting the engine 11 after the execution of the combustion stop control operation upon decreasing of the cylinder-inflow EGR gas quantity to the level equal to or smaller than the normal combustion determination threshold value during the execution of the combustion stop delay control operation, the combustion stop control operation is executed after the termination of the combustion stop delay control operation. Therefore, it is possible to limit the occurrence of the unnecessary lengthening of the combustion stop delay control operation (the unnecessary delay of the execution of the combustion stop control operation).

Furthermore, in the present embodiment, when the driver of the vehicle executes the engine stop manipulation operation (e.g., turning off of the ignition switch) or when the airbag signal for deploying an airbag is outputted, the execution of the combustion stop delay control operation is prohibited or terminated. Therefore, when the driver of the vehicle executes the engine stop manipulation operation or when the airbag signal is outputted upon occurrence of the collision of the vehicle, the combustion stop control operation is immediately executed regardless of the cylinder-inflow EGR gas quantity. Thereby, the combustion of the engine 11 can be quickly stopped.

In the above embodiment, the cylinder-inflow EGR gas quantity is computed (estimated) by using the model, which simulates the behavior of the EGR gas flow quantity. However, the method of estimating the cylinder-inflow EGR gas quantity is not limited to this method and may be modified in an appropriate manner. For example, the cylinder-inflow EGR gas quantity may be computed (estimated) based on an output signal of an intake conduit pressure sensor or an output signal of the air flow meter. Furthermore, the quantity of the EGR gas, which remains in the intake conduit 12, may be sensed with a sensor as information of the cylinder-inflow EGR gas quantity (cylinder-inflow EGR gas quantity information). Alternatively, a cylinder-inflow EGR rate, a cylinder-inflow carbon monoxide (CO) quantity or a cylinder-inflow carbon monoxide (CO) concentration may be estimated or sensed as information of the cylinder-inflow EGR gas quantity.

Furthermore, in the above embodiment, the present disclosure is applied to the system, which executes the combustion stop control operation in the case where the combustion stop demand is generated upon satisfaction of the fuel cut condition or the idle reduction condition. However, the present disclosure is not limited to such a system. For instance, the present disclosure may be applied in a hybrid vehicle having an internal combustion engine and an electric motor as drive sources. More specifically, the present disclosure may be applied to a system of the hybrid vehicle, which executes the combustion stop control operation in a case where the combustion stop demand is generated upon satisfaction of a motor drive condition for driving the hybrid vehicle only with a drive force of the electric motor.

In the above embodiment, the present disclosure is applied to the engine that is provided with the supercharger and the low pressure loop (LPL) EGR device 28, which recirculates the EGR gas from the portion of the exhaust conduit 15 located on the downstream side of the catalytic converter 16 to the portion of the intake conduit 12 located on the upstream side of the compressor 19. However, the present disclosure is not limited to such an engine. For example, the present disclosure may be applied to an internal combustion engine that is provided with a super charger and a high pressure loop (HPL) EGR device, which recirculates the EGR gas from a portion of the exhaust conduit located on an upstream side of the exhaust turbine to a portion of the intake conduit located on a downstream side of the throttle valve.

Furthermore, the present disclosure is not limited to the engine, which is provided with the exhaust turbine supercharger (i.e., the turbocharger). For instance, the present disclosure may be applied to an internal combustion engine, which is provided with a mechanical supercharger or an electric supercharger.

Furthermore, the present disclosure is not limited to the engine, which is provided with the supercharger. That is, the present disclosure may be applied to a normal aspiration engine (NA engine), which is not provided with a supercharger.

Additional advantages and modifications will readily occur to those skilled in the art. The present disclosure in its broader terms is therefore not limited to the specific details, representative apparatus, and illustrative examples shown and described.

What is claimed is:

1. A control apparatus for an internal combustion engine that is provided with a low pressure loop exhaust gas recirculation (EGR) device, which recirculates a portion of exhaust gas of the internal combustion engine as EGR gas to a portion of an intake passage of the internal combustion engine located on an upstream side of a throttle valve and includes an EGR conduit and an EGR valve, wherein the EGR valve adjusts a flow quantity of the EGR gas that flows through the EGR conduit, the control apparatus comprising:
    a combustion stop control arrangement that executes a combustion stop control operation, which stops combustion in the internal combustion engine, when a predetermined combustion stop demand is generated;
    a cylinder-inflow EGR gas quantity determining arrangement that periodically computes cylinder-inflow EGR gas quantity information that indicates one of:
        a cylinder-inflow EGR gas quantity that is a quantity of the EGR gas, which flows into a cylinder of the internal combustion engine; and
        information that relates to the cylinder-inflow EGR gas quantity; and
    a combustion stop delay control arrangement that executes a combustion stop delay control operation, which delays execution of the combustion stop control operation based on the cylinder-inflow EGR gas quantity information, wherein:
    the cylinder-inflow EGR gas quantity determining arrangement computes an EGR valve-passing gas flow quantity, which is a flow quantity of the EGR gas passing through the EGR valve, by using an EGR valve model that simulates a behavior of the EGR gas at a time that the EGR valve is open and the EGR gas is passing through the EGR valve in the EGR conduit;
    the cylinder-inflow EGR gas quantity determining arrangement computes the cylinder-inflow EGR gas quantity information based on the EGR valve-passing gas flow quantity by using an EGR gas delay model, which simulates a behavior of the EGR gas after the EGR valve is closed until a time of flowing into the cylinder by using data taken before the EGR valve is closed and reflects a delay in a flow of the EGR gas between the EGR valve and the cylinder;
    the combustion stop delay control arrangement periodically determines whether a current value of the cylinder-inflow EGR gas quantity information is larger than a threshold value that varies depending on an operational state of the internal combustion engine;
    when the combustion stop delay control arrangement determines that the current value of the cylinder-inflow EGR gas quantity information is larger than the threshold value, the combustion stop delay control arrangement disables the execution of the combustion stop control operation of the combustion stop control arrangement unless the combustion stop delay control arrangement receives a demand for immediately stopping the combustion of the internal combustion engine; and
    when the combustion stop delay control arrangement determines that the current value of the cylinder-inflow EGR gas quantity information is equal to or smaller than the threshold value, the combustion stop delay control arrangement enables the execution of the combustion stop control operation of the combustion stop control arrangement.

2. The control apparatus according to claim 1, wherein:
    the combustion stop delay control arrangement determines whether normal combustion of the internal combustion engine is possible at a time of restarting the internal combustion engine after execution of the combustion stop control operation based on the cylinder-inflow EGR gas quantity information; and
    when the combustion stop delay control arrangement determines that the normal combustion of the internal combustion engine at the time of restarting the internal combustion engine after the execution of the combustion stop control operation is not possible, the combustion stop delay control arrangement executes the combustion stop delay control operation.

3. The control apparatus according to claim 2, wherein when the combustion stop delay control arrangement determines that the normal combustion of the internal combustion engine at the time of restarting the internal combustion engine after the execution of the combustion stop control operation is possible based on the cylinder-inflow EGR gas quantity information during execution of the combustion stop delay control operation, the combustion stop delay control arrangement terminates the combustion stop delay control operation.

4. The control apparatus according to claim 1, wherein the combustion stop delay control arrangement prohibits the combustion stop delay control operation upon occurrence of at least one of the following:
- a driver of a vehicle having the internal combustion engine executes an engine stop manipulation operation to stop the internal combustion engine; and
- an airbag signal, which commands deployment of an airbag of the vehicle, is outputted.

5. The control apparatus according to claim 1, wherein:
- the cylinder-inflow EGR gas quantity information indicates the cylinder-inflow EGR gas quantity;
- the cylinder-inflow EGR gas quantity determining arrangement estimates and stores a value of an EGR gas flow quantity of a portion of the EGR gas that is present between a first location of the intake passage, which is on a downstream side of the EGR valve of the low pressure loop EGR device, and a second location of the intake passage, which is on an upstream side of the cylinder, based on the EGR valve-passing gas flow quantity;
- the cylinder-inflow EGR gas quantity determining arrangement estimates a value of the cylinder-inflow EGR gas quantity based on the stored value of the EGR gas flow quantity of the portion of the EGR gas; and
- the combustion stop delay control arrangement executes the combustion stop delay control operation when the value of the cylinder-inflow EGR gas quantity is larger than a normal combustion determination threshold value.

6. The control apparatus according to claim 1, wherein when the combustion stop delay control arrangement receives the demand for immediately stopping the combustion of the internal combustion engine in a state where the current value of the cylinder-inflow EGR gas quantity information is larger than the threshold value, the combustion stop delay control arrangement enables the execution of the combustion stop control operation of the combustion stop control arrangement.

7. The control apparatus according to claim 1, wherein the cylinder-inflow EGR gas quantity determining arrangement computes the cylinder-inflow EGR gas quantity information based on a plurality of successively obtained values of the EGR valve-passing gas flow quantity, which are successively obtained one after another at predetermined time intervals.

* * * * *